United States Patent
Maynard et al.

(10) Patent No.: US 8,698,106 B2
(45) Date of Patent: Apr. 15, 2014

(54) APPARATUS FOR DETECTING FILM DELAMINATION AND A METHOD THEREOF

(75) Inventors: Helen Maynard, North Reading, MA (US); George D. Papasouliotis, North Andover, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 391 days.

(21) Appl. No.: 12/428,527

(22) Filed: Apr. 23, 2009

(65) Prior Publication Data

US 2009/0278059 A1 Nov. 12, 2009

Related U.S. Application Data

(60) Provisional application No. 61/048,273, filed on Apr. 28, 2008.

(51) Int. Cl.
*G21K 5/00* (2006.01)

(52) U.S. Cl.
USPC ............ 250/492.21; 250/492.1; 250/492.2; 250/492.3

(58) Field of Classification Search
None
See application file for complete search history.

(56) References Cited

U.S. PATENT DOCUMENTS

| | | | | |
|---|---|---|---|---|
| 4,748,335 A | * | 5/1988 | Lindow et al. | 250/559.22 |
| 6,263,941 B1 | * | 7/2001 | Bryan et al. | 156/755 |
| 6,306,729 B1 | * | 10/2001 | Sakaguchi et al. | 438/458 |
| 6,362,076 B1 | * | 3/2002 | Inazuki et al. | 438/458 |
| 6,417,515 B1 | * | 7/2002 | Barrett et al. | 250/492.21 |
| 6,700,631 B1 | * | 3/2004 | Inoue et al. | 349/45 |
| 6,702,648 B1 | * | 3/2004 | Avanzino et al. | 451/6 |
| 6,891,627 B1 | * | 5/2005 | Levy et al. | 356/625 |
| 6,988,225 B1 | * | 1/2006 | Purdy et al. | 714/49 |
| 7,217,639 B2 | * | 5/2007 | Maurice et al. | 438/458 |
| 7,385,697 B2 | * | 6/2008 | Woollam et al. | 356/369 |
| 7,846,759 B2 | * | 12/2010 | Atwater et al. | 438/57 |
| 7,892,948 B2 | * | 2/2011 | Yagi | 438/459 |
| 2002/0023725 A1 | * | 2/2002 | Bryan et al. | 156/584 |
| 2002/0068419 A1 | * | 6/2002 | Sakaguchi et al. | 438/458 |
| 2004/0173310 A1 | * | 9/2004 | Baier | 156/345.24 |
| 2006/0112986 A1 | * | 6/2006 | Atwater et al. | 136/255 |
| 2009/0042364 A1 | * | 2/2009 | Yagi | 438/459 |
| 2009/0117706 A1 | * | 5/2009 | Soeta et al. | 438/458 |

FOREIGN PATENT DOCUMENTS

JP 11012769 A * 1/1999

* cited by examiner

*Primary Examiner* — Andrew Smyth (57) ABSTRACT

A method and apparatus are described herein which allow the progression of delamination of a film to be monitored. An interferometer is used to detect the onset and progression of thin film delamination. By projecting one or more wavelengths at a surface, and measuring the reflectance of these projected wavelengths, it is possible to monitor the progression of the delamination process. Testing has shown that different stages of the delamination process produce different reflectance graphs. This information can be used to establish implantation parameters, or can be used as an in situ monitor. The same techniques can be used for other applications. For example, in certain implantation systems, such as PECVD, a film of material may developed on the walls of the chamber. The techniques described herein can be used to monitor this separation, and determine when preventative maintenance may be performed on the chamber.

14 Claims, 9 Drawing Sheets

APPARATUS FOR DETECTING FILM DELAMINATION AND A METHOD THEREOF

This application claims priority of U.S. Provisional Patent Application Ser. No. 61/048,273, filed Apr. 28, 2008, the disclosure of which is hereby incorporated in its entirety by reference.

FIELD

The present disclosure is related to an apparatus and a method for detecting and controlling delamination of a film.

BACKGROUND

Ion implantation is used to perform a variety of functions. One such function is the doping of a semiconductor material, such as a wafer, to change its electrical properties. The goal of this process is to create a region within the substrate that has a polarity that may be different from the surrounding area. This process is used to develop integrated circuits, used in electronic components such as processors, memories, and other devices. In this embodiment, techniques such as, but not limited to, CVD, PECVD, plasma immersion and beamline implantation, may be used to introduce ions to the substrate.

More recently, interest has grown in using ion implantation to cleave a thin film of material from a bulk substrate. There are several methods of performing a cleave process, such as one referred to as "SmartCut". This process is used for many applications, including the preparation of silicon-on-insulator (SOI). Briefly, a semiconductor substrate, such as a wafer, receives a surface treatment to oxide the surface. This creates an insulating layer around the substrate. An ion implantation of hydrogen and/or helium is then applied to the substrate. In some embodiments, the substrate is then flipped and bonded to a handle substrate. This handle substrate may be silicon, quartz or some other suitable material. The implanted hydrogen or helium ions tend to cause bubbles while the substrate is being annealed. These bubbles may aggregate to form a layer within the substrate. The depth of this layer is dependent on the concentration and energy of the hydrogen ions, as well as the anneal time. This layer weakens the substrate at that position, allowing it to be cleaved. This cleaved interface is then smoothed, using techniques such as chemical-mechanical polishing (CMP). The resulting film and handle substrate is then suitable for use in a SOI process. The remainder of the original semiconductor wafer can be reused to create another thin film.

In addition to the SOI process, cleaving processes are also gaining interest for other applications, such as a method of fabricating solar cells. As with SOI, these thin films are susceptible to strain, which can deform or destroy the film. Accordingly, it may be desirable to detect and monitor the delamination process. Furthermore, in addition to monitoring the delamination process, it would be beneficial to control the thin film delamination process. Additionally, it would be desirable if these techniques were used to determine delamination of other surfaces, such as chamber walls and equipment.

SUMMARY

The problems in the prior art are overcome by the method and apparatus described herein. An interferometer is used to detect the onset and progression of thin film delamination. By projecting one or more wavelengths at a surface, and measuring the reflectance of these projected wavelengths, it is possible to monitor the progression of the delamination process. Testing has shown that different stages of the delamination process produce different reflectance graphs. This information can be used to establish implantation parameters, or can be used as an in situ monitor.

The same techniques used to detect delamination of a thin film from a semiconductor substrate can be used for other applications. For example, in certain systems, such as a CVD reactor, a film of material may be deposited on the walls of the chamber. This film is not deleterious until it begins separating from the wall. The techniques described herein can be used to monitor this separation, and determine when preventative maintenance may be performed on the chamber.

BRIEF DESCRIPTION OF DRAWINGS

For a better understanding of the present disclosure, reference is made to the accompanying drawings, which are incorporated herein by reference and in which.

DESCRIPTION

In the present disclosure, several embodiments of an apparatus and a method for detecting film delamination are introduced. For illustrative purpose, the present disclosure may be made in context to systems for manufacturing and/or processing thin films. However, those in the art will recognize that the present disclosure need not be so limited. Indeed, the present disclosure is applicable for detecting delamination of a thin film where such a delamination is desired or undesired. Accordingly, the present disclosure may also be applicable for systems for detecting delamination of the film from a bulk material caused by wear and tear.

Among systems for manufacturing and/or processing thin films, the present disclosure will focus on a beam-line ion implantation system for a purpose of clarity. However, those in the art will recognize that the present disclosure may also be applicable to other types of systems for manufacturing and/or processing thin films. For example, the present disclosure may be applicable to a plasma based system including a plasma immersion ion implantation system. In addition, the present disclosure may also be applicable to optical based thin film processing system.

In the present disclosure, the thin film may be conducting, semiconducting, or insulating material. For example, the thin film may be Aluminum (Al) thin film, silicon (Si) thin film, Gallium Arsenide (GaAs) thin film, Germanium (Ge) thin film, diamond thin film, organic or polymeric thin film. The thin film may be transparent to at least a portion of the electromagnetic spectrum. Meanwhile, the substrate may also be conducting, semiconducting, or insulating material. The ions disclosed in present disclosure may be atomic or molecular ions. Further, although the present disclosure may focus of system based on ions, the present disclosure may also be applicable to other particle based systems such neutral particle based system and photon based system. As such, the thin film, substrate, nor particles in the present disclosure need be limited to a particular type of film, substrate, nor particles.

Figure 1:
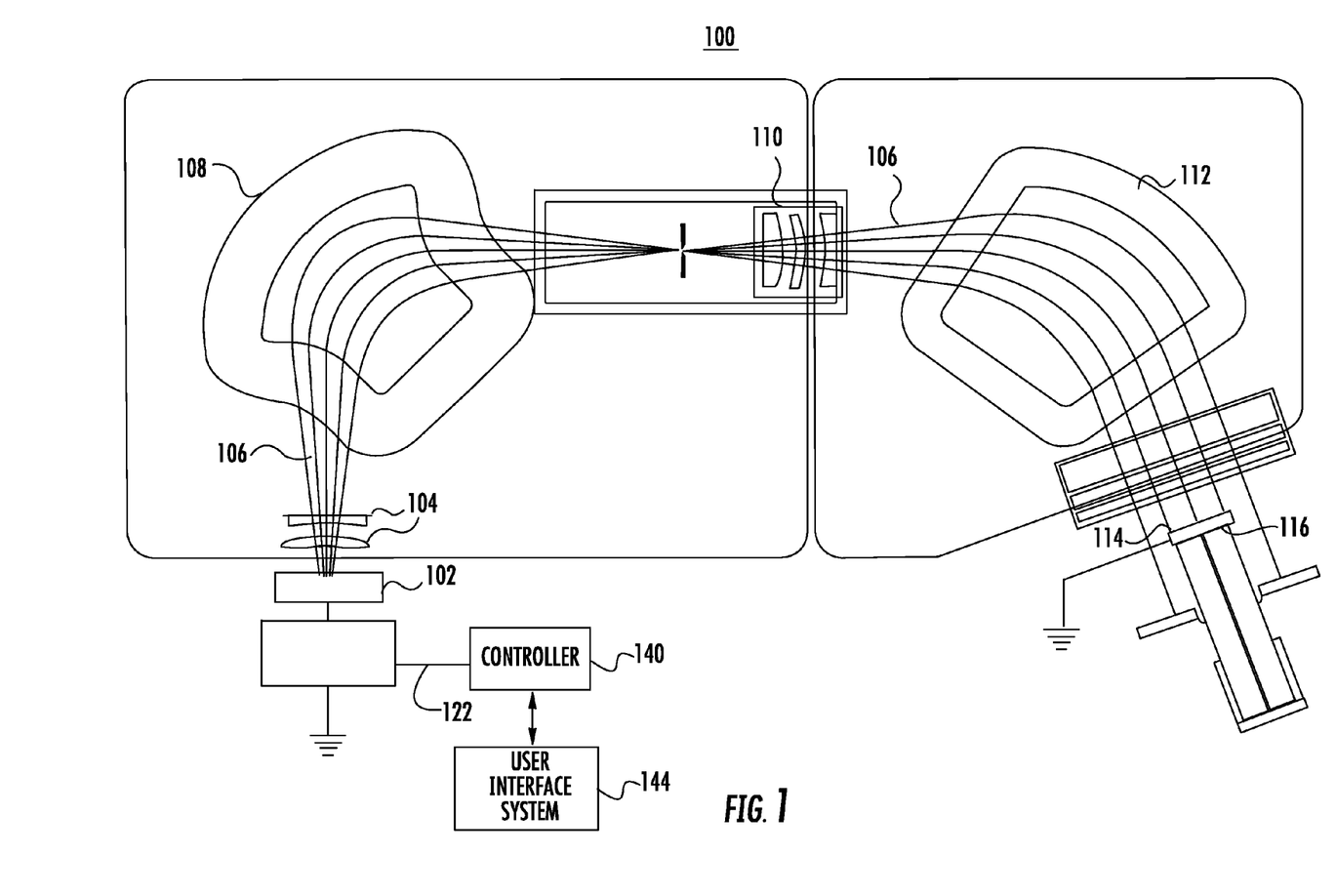
FIG. 1 is an embodiment of an ion implanter.

FIG. 1 illustrates an apparatus for manufacturing a thin film. The cleaving process, unlike conventional ion implantation processes, does not form or deposit the film on the substrate. Instead, the cleaving process cuts or separates the film from a bulk substrate. Among other tools, a beam-line ion implanter 100 may be used to perform the cleaving process. A block diagram of a conventional ion implanter 200 is shown in FIG. 1. The conventional ion implanter may include an ion source 102 for generating ions. The ion implanter 100 may also comprise a series of beam-line components through which ion beam 106 passes. Examples of the beam-line components may include extraction electrodes 104, a magnetic mass analyzer 108, a plurality of lenses 110, and a beam parallelizer 112. The ion implanter 100 may also include a platen 116 supporting the wafer 114 to be implanted. The wafer 114, meanwhile, may be moved in one or more dimensions (e.g., translate, rotate, and tilt) by a component, sometimes referred to as a "roplat" (not shown).

During implantation, the ions of desired species, such as hydrogen and helium ions, are generated and extracted from the ion source 102. Thereafter, extracted ions 106 travel in a beam-like state along the beam-line components and implanted to the wafer 114. Much like a series of optical lenses that manipulate a light beam, the beam-line components manipulate the ion beam 106. The ion beam 106 manipulated by the beam-line components is directed.

Figure 2A:
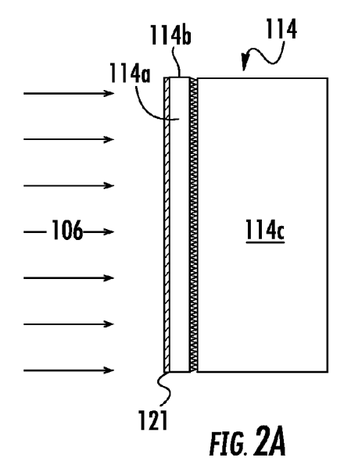
FIG. 2 shows the steps used in a traditional SOI process.

As described above, one application that uses a cleaving process is the creation of SOI substrates. As illustrated in FIG. 2a, ions such as protons or hydrogen and/or helium ions 106 directed toward the wafer 114 are implanted at a predetermined depth. In some embodiments, the wafer 114 has been treated so as to create an insulation layer 121 on the top surface. This may be achieved by oxidizing the top surface. The implanted ions coalesce to form an intermediate hydrogen layer 114b, between upper layer or thin film 114a and lower layer 114c or bulk of the wafer 114, and the film 114a may be delaminated or separated from the bulk 114c.

Figure 2B:
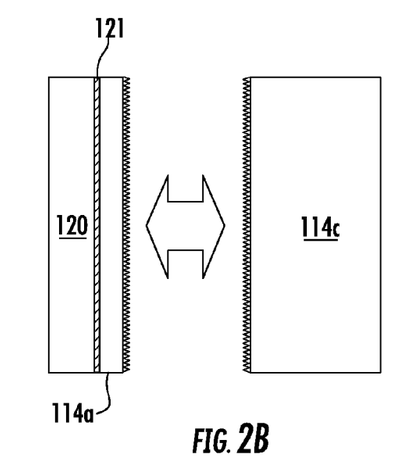

As shown in FIG. 2b, to form a thin silicon-on-insulator (SOI) film, a substrate 120, such as silicon, quartz or polyethylene terephthalate (PET), may be affixed to the film 114a and the film and the substrate 120 may be delaminated or separated from the bulk 114c. After separation, a thin SOI film may result. As seen in FIG. 2b, the cleaving process results in a uneven or jagged edge.

Figure 2C:
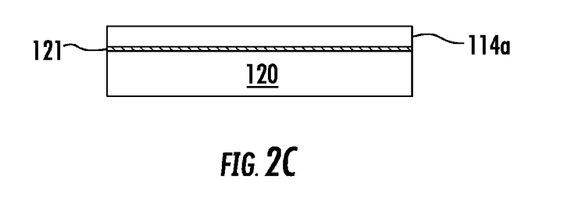

Typically, the resulting SOI wafer contains a substrate 120, and a thin film layer 114a, often with an insulating layer 121 separating these two substrates. The SOI wafer then undergoes a polishing step, such as chemical-mechanical polishing (CMP) to smooth the top surface. The resulting wafer is shown in FIG. 2c. The remainder of the unused wafer 114c may be used in a subsequent cleaving process.

During implantation of ions 106 and formation of the intermediate layer 114b, the upper layer 114a may be under a strain. The film 114a may also experience strain as the film 114a is delaminated from the bulk 114c. As the film 114a is relatively thin, excessive strain may cause deformation or even catastrophic failure of the film 114a.

Figure 3:
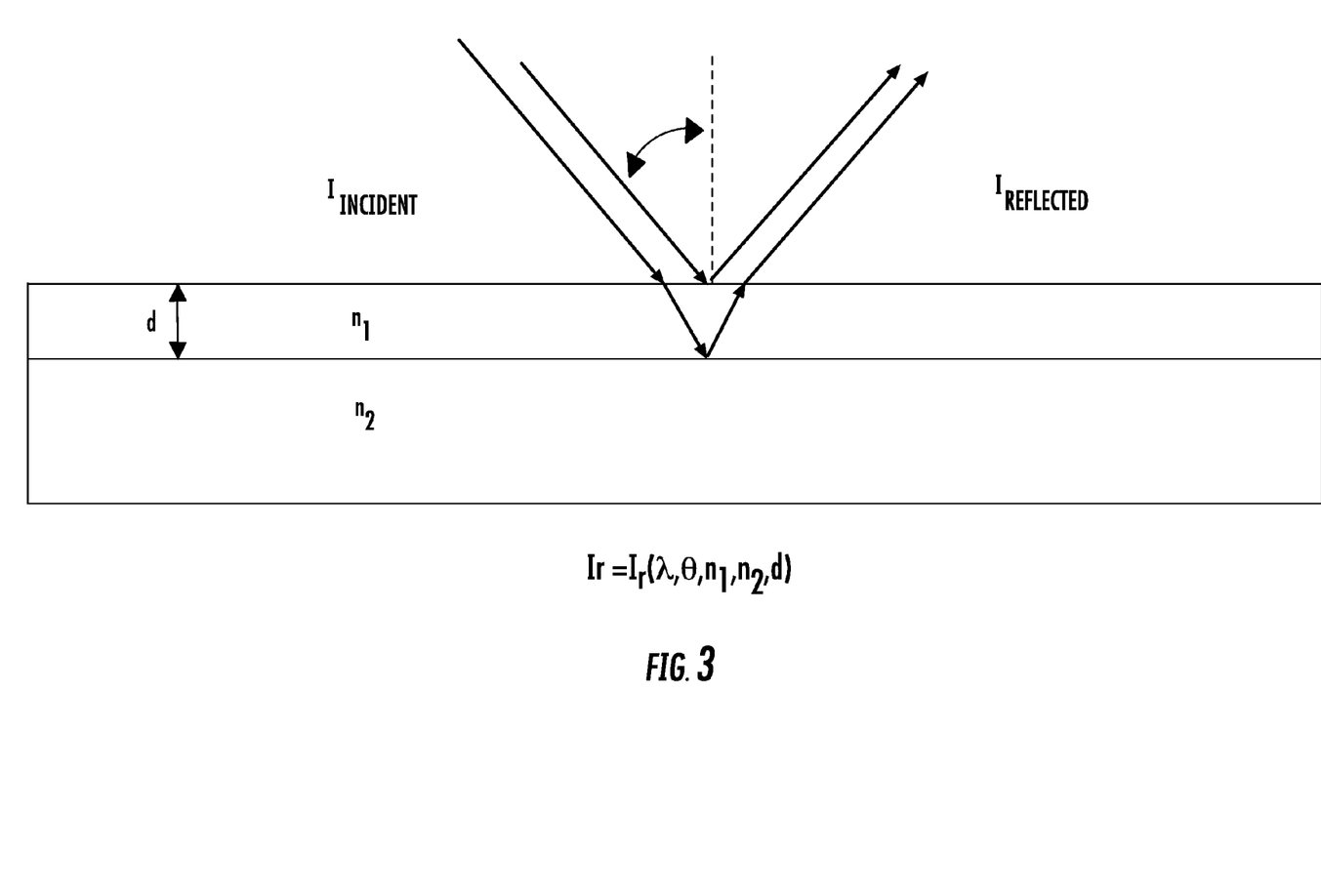
FIG. 3 is a diagram showing the operation of an interferometer.

Interferometry is a technique whereby light is incident on a sample, and the reflected intensity is monitored. FIG. 3 illustrates a diagram of this measurement technique in which a light is incident on a sample (at an angle) and the reflected intensity is monitored. The light can also be incident at a normal angle. The percentage of the incident light that is reflected, the reflectivity, is a function of the thickness of the film and its optical properties. As suggested by the equation shown in FIG. 3, the reflected intensity is a function of the incident light intensity, the wavelength and incident of that incident light, the thickness of the film, and the optical properties of the film and the underlying substrate.

Reflectivity is a measure of the amplitude of the reflected light as a function of the incident light. Thus, a reflectivity value of 0.5 indicates that the reflected wave has an intensity that is 50% of the incident wave.

Figure 4A:
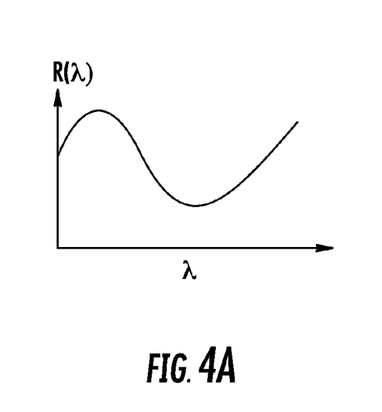
FIG. 4 illustrates two embodiments for determining reflectivity.
Figure 4B:
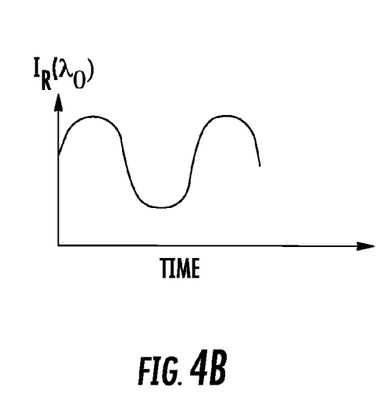

FIG. 4 shows the two ways to monitor the reflectivity of the sample. In FIG. 4a, the reflectivity of a substrate as a function of wavelength may be monitored by passing the broadband light source through a monochromator. The resulting waveform shows the reflectivity of the sample as a function of wavelength or frequency. As shown in FIG. 4b, a single wavelength may be chosen, and the single wavelength may be monitored for change in reflectivity as a function of time. In the present disclosure, the wavelength is not limited to a single wavelength. Instead, a multi-wavelength optical beam may be used to detect a thin film delamination. In some embodiments, a multiwavelength measurement may be used, as this technique may provide more information. In other embodiments, the single wavelength implementation may be used, as it may be simpler to implement, as the detector used in single wavelength measure may be a photodetector. The choice of which technique to use is dependent on the application, and the present disclosure is not limited to a specific embodiment.

In the cleaving process, ionized particles, such as hydrogen or helium, may be implanted. During subsequent thermal processing, these particles may diffuse from lattice site of the substrate and into voids/pockets formed by during the implant process. As the particles gather in such pockets/voids, the particles may form bubbles. If the internal pressure exerted by the pockets/voids exceeds the coherent strength of substrate, then the film may delaminate. In the present disclosure, this delamination process can be detected by thin film reflectance, as shown in FIG. 5.

Figure 5:
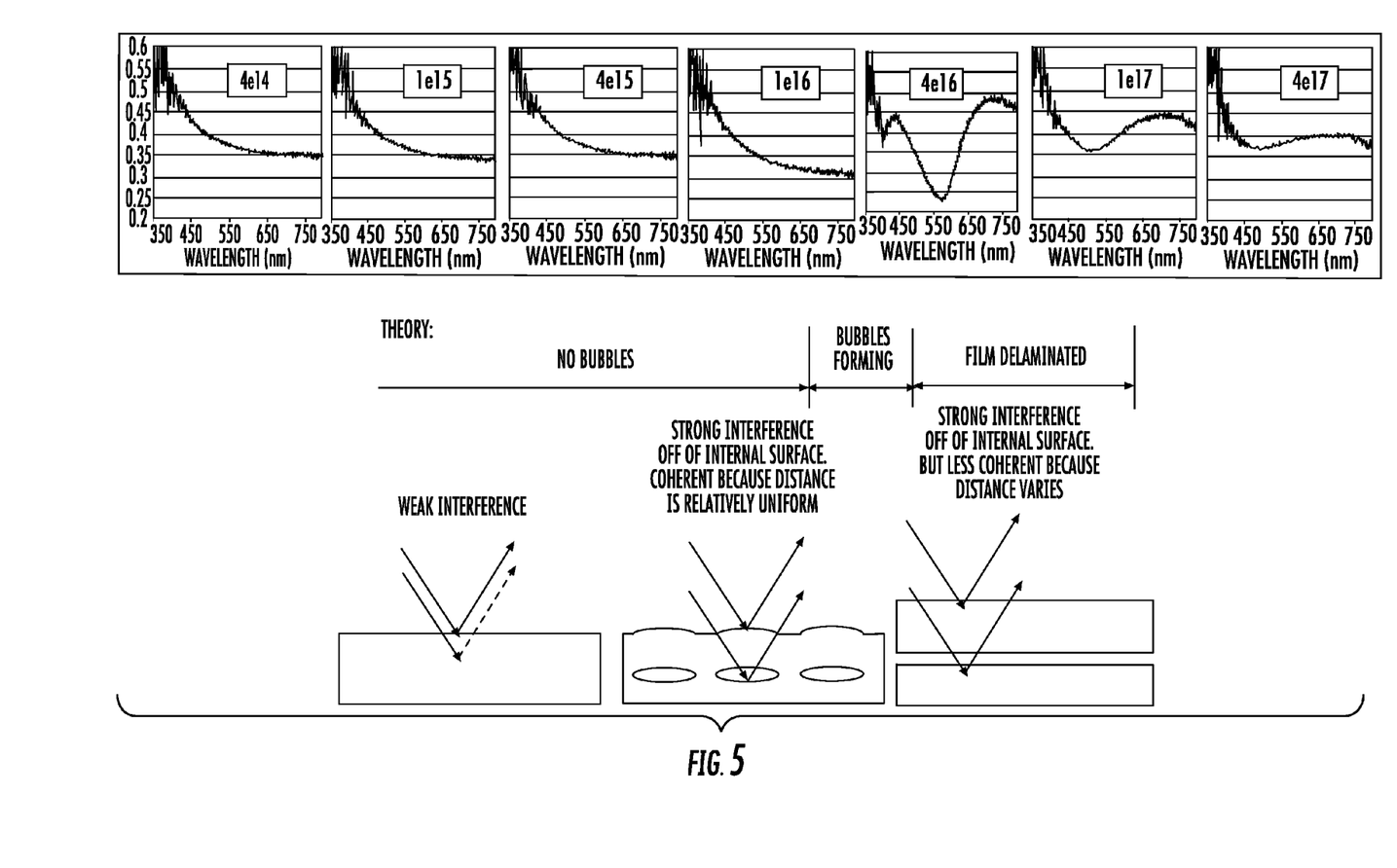
FIG. 5 shows the reflectivity of substrates implanted with different doses of ions.

In FIG. 5, the top row shows the thin film reflectance curves for increasing implanted dose. The terms reflectance and reflectivity are used interchangeable throughout this disclosure, and both are defined to be a measure of the reflected light intensity in comparison to the incident light intensity. The particles used for the implantation may be a mixture of particles containing a substantial portion of helium and/or hydrogen. The substrates have all been annealed at 600° C. for 5 minutes. As the dose of the particles increases from $4e14/cm^2$ to $4e16/cm^2$, the reflectance shows a strong fringe, indicating creation of a free surface within the substrate lattice from which the reflection is quite strong. Beyond this dose, the amplitude of the fringe decreases indicating loss of coherence between the film and substrate and presence of delamination. The term fringe is used to indicate a change in the reflectivity at one or more wavelengths.

The creation of bubbles within the substrate, as seen in the graph labeled 4e16, shows an unexpected large decrease in reflectivity at about 570 nm, and an increase in reflectivity at about 730 nm. This may be explained by the interaction of the incident wave with the substrate. As the substrate begins to bubble, there is strong interference from the internal surface (i.e. the bottom surface of the bubble). Due to the characteristics of the bubble, the light reflected from the internal surface may be highly coherent. This high degree of coherence results in large increases and decreases in reflectivity, depending on the relationship between the thickness of the film and the phase of the reflected light. As the film delaminates, the level of coherence decreases, due to the uneven gap between the film and the underlying substrate. This decreased coherence reduces the amplitude of both the downward and upward spikes. However, the delaminated film (i.e. the two rightmost graphs) still demonstrates a different profile than the substrate prior to delamination (i.e. the four leftmost graphs). These differences allow an operator to monitor the progression of the delamination process.

Figure 6:
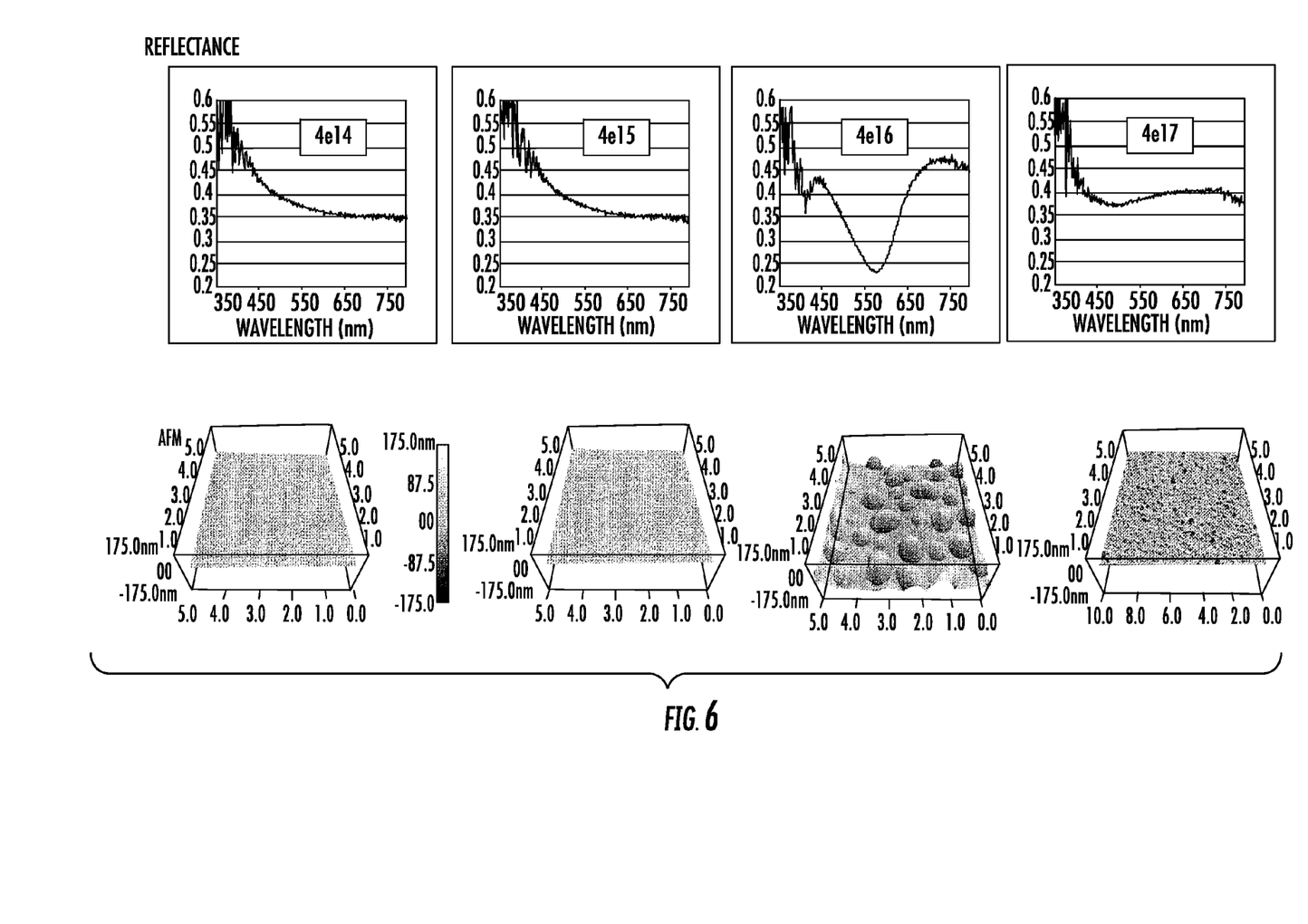
FIG. 6 shows the reflectivity of substrates implanted with different doses of ions and the corresponding atomic field microscope pictures.

The three stages of delamination shown in FIG. 5 (no bubbles, bubbles forming, film delaminated) were confirmed using an atomic force microscope (AFM). FIG. 6 shows 4 representative reflectance graphs from FIG. 5. For each of these graphs, the corresponding AFM picture is shown directly below it. Note that, for the two leftmost graphs, the reflectance shows no unusual behavior, and specifically shows a general decrease in reflectance as the wavelength increases. The minimum reflectance appears to be about 0.35. The corresponding AFMs for these graphs show no bubbles have formed yet, thus the reflectance is almost exclusively from the top surface. The third graph shows the greatest amplitude variation, with a large decrease in amplitude at 570 nm and an increase in amplitude at 730 nm. The AFM graph below shows the presence of large surface bubbles, which are the cause of this effect. Finally, the rightmost graph shows a film that has been delaminated. In contrast to the first two graphs, this graph shows an increase in reflectivity between the wavelengths of roughly 450 nm to about 730 nm. Again, the AFM picture appears below the graph and shows that the film has delaminated.

To monitor the delamination of a wafer, a light source using a wavelength (or range of wavelengths) that may be substantially transparent to the substrate may be chosen. Based on the graphs shown in FIG. 5, if a single frequency source is used, light at a wavelength of 530 nm may be used to determine when delamination has occurred. For a multiwavelength light source, much of the infrared band would be applicable if the substrate of interest is silicon. This transparency is desirable as there should be at least some penetration into the bulk of the substrate by the light. In the present disclosure it may be desirable for the thin film to be thin enough to allow some transmission of the light. For example, it may be desirable for approximately 10% of incident light to be transmitted.

Figure 7A:
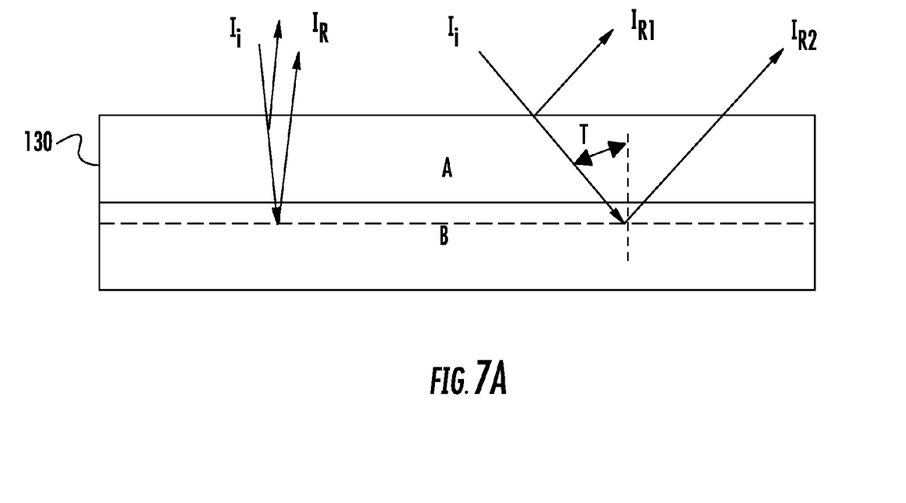
FIG. 7 shows two different incident angles which may be used.

As illustrated in FIG. 7A, the light should be incident on the substrate and at least a portion of the incident light should be reflected from the substrate 130. In this Figure, $I_i$ represents the incident intensity and $I_R$, the reflected intensity. The left-hand portion of the diagram shows the setup for normal or near-normal incidence. The optical beam may reflect from several interfaces—including the backside of the wafer and the internally separating interface. If the other reflections obscure the signal of interest, then an interferometer that strikes the substrate at an angle may be implemented. In this way, a reflected optical beam that is not of interest may be separated out (by confining the detector area to sample only the reflection of interest).

Figure 7B:
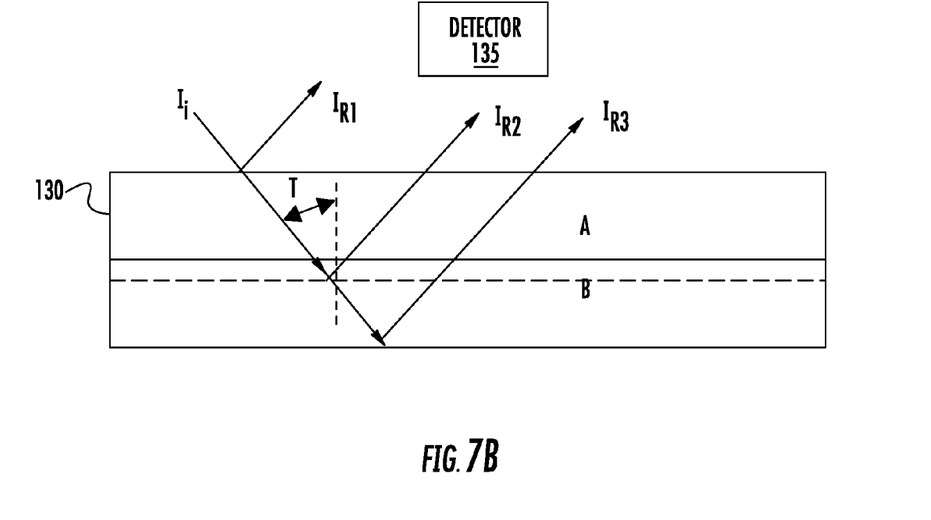

As an example, FIG. 7B shows a light wave incident on a substrate 130 at an angle. In this example, light may be reflected from the top surface ($I_{R1}$), the bottom surface ($I_{R3}$), and the internal surface of interest ($I_{R2}$). If the magnitude of $I_{R1}$ or $I_{R3}$ is too great, the changes in $I_{R2}$ may not be easily detected. By projecting the light at an angle at the substrate, three distinct reflection paths are created. In such an instance, the detector 135 may be located in the path of $I_{R2}$. By locating this detector in the path of $I_{R2}$, such that it cannot detect reflected light $I_{R1}$ or $I_{R3}$, the accuracy of the detector 135 may be improved.

As stated above, the graphs shown in FIGS. 5 and 6 were created by using different concentrations of implanted material, with a constant anneal time. However, the method described herein can be used in other applications. For example, in one embodiment, a predetermined concentration of ions, such as hydrogen and helium ions, can be implanted in the substrate. The substrate is then subjected to an anneal process. As the substrate is heated, it will undergo the various steps shown in FIG. 5, namely, after some time, bubbles will begin to form. Later, the thin film will delaminate.

A beam of light, as described above, can be directed toward the substrate while it is being annealed. As the substrate is being annealed, the hydrogen and helium ions diffuse in the substrate, forming bubbles. As described above, these bubbles can be detected. Thus, by placing a light source and detector within the anneal chamber, it is possible to determine when the film has delaminated, based on the changes in the reflectivity or reflectance graph. Upon detection of this condition, the annealing process can be terminated. Alternatively, the interferometer may be placed outside the anneal chamber, using a transparent window to project light into the chamber.

In another embodiment, the substrate is not annealed. Rather, ions are implanted into the substrate continuously, until the substrate begins to bubble as described above. A light source and detector are located so as to be incident on the substrate during the implant process. Once the film has delaminated, based on changes to its reflectance graph, the ion implantation process is terminated.

Thus, the method described herein can be used to determine and control either ion implantation time or anneal time. The present method can be used in situ to determine the appropriate time required to achieve the desired level of delamination. The location of the light source and the detector is dependent upon the portion of the process that is to be monitored and controlled. For example, the manufacturing process may include a predetermined dose of particles be implanted into a substrate. The substrate is then annealed, where an interferometer is able to observe changes in the reflectance graph. Upon determination by the interferometer that the top film has delaminated, a controller, in communication with the interferometer may terminate the anneal cycle.

In another embodiment, the method used above is not used in situ, but rather is used to determine the appropriate standardized process parameters. For example, a test environment may be created where the light source and detector are located so as to be incident on the substrate. As described above, the interferometer may monitor the substrate at a number of steps in the process, including but not limited to the implantation step or the anneal step. One or more tests are performed using this interferometer and the time required to achieve the desired degree of delamination is determined. Using the data collected during the test process, a standard process can be established, such that the light source and detector need not be used during normal operation. In other words, it may be determined that for a given dose, test data suggests that an anneal time of 5 minutes results in the proper amount of film delamination. In this case, the standard process can be established wherein the anneal time is set to 5 minutes.

The present method is not limited to detection of delamination of a semiconductor wafer. As an example of a second implementation, present disclosure may be applicable to a surface where detection of film delamination is desired.

Figure 8:
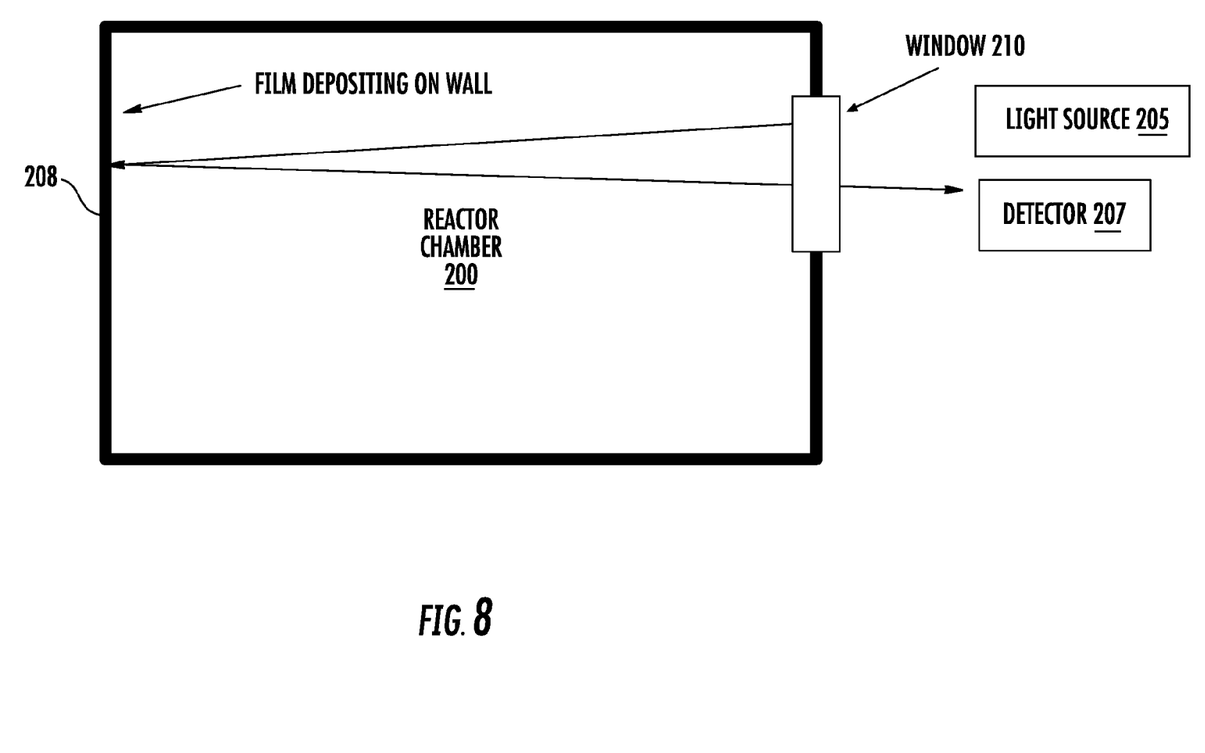
FIG. 8 shows an embodiment in which the walls of a reactor are monitored.

Film delamination is a common problem in reactors in which deposition is present, including etch, deposition and some implanters (e.g. PLAD). A light source 205 may output a light beam toward the reactor wall 208 and monitor the reflectance for evidence of delamination. FIG. 8 shows a reactor chamber 200, having a window 210 through which light can pass. The light is reflected off the opposite wall 208 and back through the window 210. The light source 205 and detector 207 may both be located outside the chamber 200, such that they operate through the window 210.

If a chamber wall 208 delaminates, there may be thin-film interference between the top and bottom surfaces of the film wall, which may cause a change in the reflectance or reflectivity. This change could be an increase or decrease in intensity, depending on the optical characteristics of the film and the wavelength(s) being used, as described above. When the system detects delamination, this may indicate that maintenance or in situ clean may be performed.

Currently, cleaning of chamber walls is done as part of the preventative maintenance (PM). Typically, a PM cycle is recommended based on the number of cycles, or the number of elapsed hours since the last cleaning. In order to insure that flaking films do not contaminate the chamber, it is customary that the PM cycle will be performed more frequently than necessary. By incorporating a method of detecting the delamination of film from a chamber wall, the frequency of PM can be decreased, as it is now possible to determine exactly when the chamber wall will begin to delaminate.

Figure 9A:
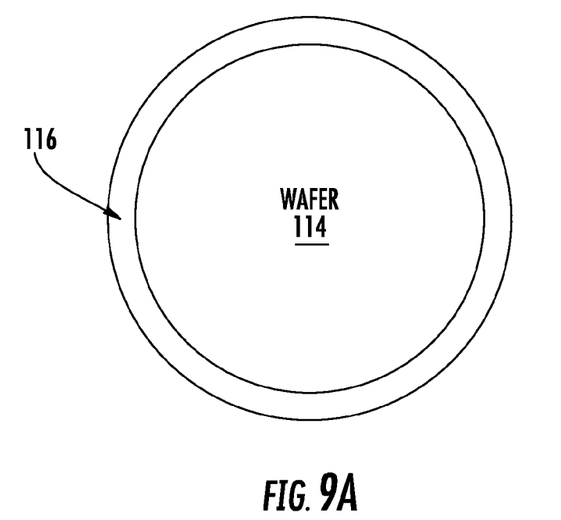
FIG. 9 shows a front and top view of a wafer and its associated holder.
Figure 9B:
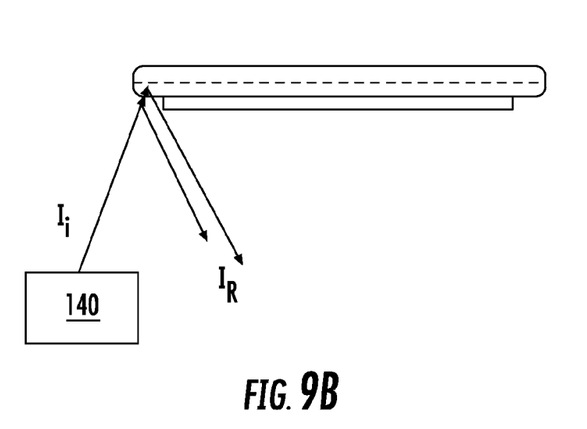

This method can be used for any solid that tends to accumulate gaseous species, including apparatus within the reactor chamber. In addition to monitoring film on the chamber walls, the present method can be used to monitor film buildup and delamination on the associated equipment, such as the platen 116, and other components of the ion beam line, such as the magnet 112. Porous materials, such as graphite, may be less susceptible to bubbling as the gas may be able to diffuse to the surface and out into the chamber environment, but they have their own challenges with suppressing particle formation. FIG. 9A shows a front view of the wafer 114 in a semiconductor process. Note that the platen 116 extends beyond the edge of the wafer 114, and is therefore exposed to the ion beam. As a result, film may develop on the exposed portion of the platen 116. FIG. 9B shows a top view of the platen 116 and the attached wafer 114. To monitor the surface of the platen 116, a light source 140 may be aimed and focused at the fixture, as shown in FIG. 9B. As described above, the choice of wavelength would depend on the material used for the platen. Preferably, the light should be of a frequency that is transparent to the material of the platen. Thus, if the platen is silicon, a wavelength (or range of wavelengths) in the visible and/or IR bands may be applicable. If the platen is metal or a semi-metal, such as graphite, a suitable wavelength may best be determined empirically. Alternatively, if the platen is made of an insulator such as quartz or a ceramic, then there are typically some suitable bands of transparency, which can be determined by referring to the optical properties of these materials. The reflected beam $I_R$ would then be sensed by the detector, so that its reflectance graph can be generated and monitored. The monitoring of the reflected beam may have to be synchronized with the motion of the platen.

As noted earlier, the present disclosure is not limited to semiconductor manufacturing/processing system. On the contrary, the present disclosure may be equally applicable to detecting film lamination on a wall where a strip or film of the wall delaminates due to wear and tear.

What is claimed is:

1. A method of monitoring delamination of a film from a target comprising:
   projecting light at said target while the target is being processed, wherein processing of the target comprises ion implanting;
   detecting said light reflected from said target and measuring the reflectivity of said target;
   comparing said measured reflectivity to a first expected reflectivity;
   determining presence of bubbles forming in said target based on said comparison to said first expected reflectivity;
   continuing to implant ions after said determining of said presence of bubbles;
   comparing said measured reflectivity to a second expected reflectivity; and
   determining presence of delamination of said film from said target during the processing of the target based on said comparison to said second expected reflectivity.

2. The method of claim 1, wherein said projected light comprises a plurality of wavelengths.

3. The method of claim 2, wherein said measuring and comparing steps are performed for a plurality of wavelengths.

4. The method of claim 1, wherein said comparing steps comprise detecting an increase or decrease in amplitude at one or more frequencies.

5. The method of claim 1, further comprising repeating said projecting, measuring, comparing and determining a plurality of times.

6. The method of claim 1, wherein said processing is terminated in response to said determining presence of delamination of said film step.

7. The method of claim 1, wherein said processing is ion implanting into said target during said measuring, comparing and determining steps.

8. The method of claim 7, wherein said ion implanting step is terminated in response to said determining presence of delamination of said film step.

9. The method of claim 1, wherein said target comprises a semiconductor wafer.

10. The method of claim 1, further comprising scanning light in at least one direction.

11. A method for processing a substrate, the method comprising:
    performing a first process on the substrate, wherein the first process comprises implanting ions into said substrate so as to form at least one gas bubble between two portions of the substrate;
    directing radiation toward the substrate during the performing the first process;
    receiving radiation directed toward the substrate during the performing the first process and reflected from the substrate;
    detecting, based on said reflected radiation, that one of said portions has delaminated from a second of said portions; and
    terminating the first process based upon said detection.

12. The method of claim 11, further comprising performing a second process on the substrate, wherein the second process is performed after detecting the endpoint of the first process.

13. The method of claim 12, wherein the second process comprises separating the two portions of the substrate.

14. The method of claim 11, further comprising:
- determining, before said detection, based on said reflected radiation, that said at least one gas bubble has formed; and
- continuing to implant ions into said substrate after said determination and before said detection.

* * * * *